(12) United States Patent
Chung et al.

(10) Patent No.: US 6,797,763 B2
(45) Date of Patent: Sep. 28, 2004

(54) CARBON BLACK CONTAINING EPDM COMPOSITIONS HAVING EITHER A HIGH GLOSS OR A TEXTURED MATTE FINISH

(76) Inventors: Bin Chung, 12 Dacon Dr., Nashua, NH (US) 03063; John M. Funt, 11 Byron Dr., Nashua, NH (US) 03062; Bruce E. Mackay, 1 Summer St., Framingham, MA (US) 01701; Mark A. Wilkinson, 61 Harding Rd., Lexington, MA (US) 02173

( * ) Notice: Subject to any disclaimer, the term of this patent is extended or adjusted under 35 U.S.C. 154(b) by 0 days.

(21) Appl. No.: 08/967,876

(22) Filed: Nov. 12, 1997

(65) Prior Publication Data

US 2004/0092646 A1 May 13, 2004

Related U.S. Application Data

(63) Continuation of application No. 08/632,644, filed on Apr. 15, 1996, now abandoned, which is a continuation of application No. 08/086,793, filed on Jul. 2, 1993, now abandoned, which is a continuation-in-part of application No. 07/936,818, filed on Aug. 27, 1992, now abandoned.

(51) Int. Cl.[7] .................................................. C08K 3/04

(52) U.S. Cl. ..................................................... 524/495

(58) Field of Search ................................. 524/495–496, 524/847, 572

(56) References Cited

U.S. PATENT DOCUMENTS

| 4,071,496 A | * | 1/1978 | Kraus et al. ................. 524/496 |
| 4,499,228 A | | 2/1985 | Ogawa et al. |
| 4,981,900 A | | 1/1991 | Sugaware |
| 5,236,992 A | * | 8/1993 | Bush ........................... 524/495 |
| 5,272,203 A | * | 12/1993 | Joyner et al. ................ 524/474 |
| 5,354,796 A | | 10/1994 | Creecy et al. |

FOREIGN PATENT DOCUMENTS

| EP | 0313045 | 4/1989 | |
| EP | 0 313 045 | 4/1989 | ......... C08F/236/02 |
| JP | 59-197451 | 4/1983 | ............ C08K/3/04 |
| JP | 60-23431 | 7/1983 | ............ C08K/3/04 |
| JP | 59-197451 | 11/1984 | |
| JP | 60-23431 | 2/1985 | |
| JP | 61-250042 | 4/1985 | ............ C08K/3/04 |
| JP | 0250042 | * 11/1986 | ................. 524/496 |
| JP | 61-250042 | 11/1986 | |
| JP | 64-85242 | 9/1987 | ............ C08K/3/04 |
| JP | 88-108595 | 4/1988 | |
| JP | 88-108595 | 5/1988 | |
| JP | 64-85242 | 3/1989 | |
| JP | 3-149243 | 11/1989 | ............ C08K/3/04 |
| JP | 2011664 | 1/1990 | |
| JP | 3-227343 | 1/1990 | ............ C08K/3/04 |
| JP | 2308835 | 12/1990 | |
| JP | 3014848 | 1/1991 | |
| JP | 3-149243 | 6/1991 | |
| JP | 3-227343 | 10/1991 | |
| JP | 5032827 | 2/1992 | ............ B60C/1/00 |
| JP | 4198273 | 7/1992 | |
| JP | 5032827 | 2/1993 | |
| WO | WO91/17114 | 11/1991 | |
| WO | WO 91/17114 | 11/1991 | ............ C08K/3/04 |
| WO | WO93/10194 | 5/1993 | |
| WO | WO 93/10194 | 5/1993 | ............ C09C/1/50 |
| WO | WO93/10195 | 5/1993 | |
| WO | WO 93/10195 | 5/1993 | ............ C09C/1/50 |
| WO | WO93/18094 | 9/1993 | |
| WO | WO93/21270 | 10/1993 | |
| WO | WO94/05732 | 3/1994 | |

OTHER PUBLICATIONS

Degussa AG Opposition Reply Brief With English Transistion of EP 93 921 214.8/0626980 Dated Feb. 6, 2003.

English Translation of Degussa Reply Brief (#1 above).

Filed German Translation of EP 93 921 214.8/0626980 Dated Mar. 30, 2001 (English translation equals EP 0 626 980).

Provision Of A Copy Of The Minutes in Accordance with Rule 76(4) EPC of 93 921 214.8/0626980 Dated Apr. 4, 2003 (in English).

CRX 1377, Ein neuer Ruβ von Cabot mit einem interessanten Eigenschaftsprofit, Cabot GmbH Hanau Techical Service, May 1993.

Technische Information, Degussa AG–GB AC, Jun. 1988.

Formulations, Buna H01s AP, 1992 Edition.

1991 Annual Book of ASTM Standards, vol. 09.01, Section 9, Rubber, Natural and Synthetic—General Test Methods; Carbon Black.

Funt, J.M. & Chung, B., Industrial Rubber Products: Carbon Black And Compound Performance, Cabot Corp. Rubber World, May 1990.

Huser, S.A., Neuartige EPDM–Polymere für Fenster–und Tördichtungen im Automobilbau, GAK Jul. 1991–Jahrgang 44.

Form PTO–892 Corresponding to USSN 08/086,793.

Search Report From Patent Office of Australian Industrial Property Organization Corresponding to USSN 08/086,793.

PCT International Search Report For International Application No. PCT/US93/08070 Corresponding to USSN 08/086, 793.

Communication Of A Notice Of Opposition of EP 93 921 214.8/0626980 Including Appeal Brief Of Opponent Dated Jan. 18, 2002.

(List continued on next page.)

*Primary Examiner*—Peter Szekely

(57) ABSTRACT

EPDM compositions comprising EPDM and specified carbon blacks which, when extruded or shaped, exhibit either a highly gloss or a textured matte finish. The carbon black is present in an amount of 100 to about 300, and more preferably about 150 to about 250, parts by weight per 100 parts by weight EPDM.

5 Claims, No Drawings

OTHER PUBLICATIONS

Communication Pursuant To Article 96(2) EPC of EP 98 120 008.2 Dated Mar. 27, 2002.

Summons To Attend Oral Proceedings Pursuant To Rule 71(1) EPC of EP 93 921 214.8/0626980 Including Agenda From Opposition Division Dated Oct. 24, 2002.

Summons To Attend Oral Proceedings Pursuant To Rule 71(1) EPC of EP 93 921 214.8/0626980 Dated Nov. 18, 2002 (Change in Date).

Invitation Pursuant To Article 96(2) And Rule 51(2) EPC of EP 98 120 008.2 Dated Dec. 4, 2002.

Decision Revoking The European Patent (Article 102(1), (3) EPC) of EP 93 921.214.8/0626980 Dated Apr. 4, 2003.

CRX 1377, Ein neuer Ruβ von Cabot mit einem interessanten Eigenschaftsprofit, Cabot GmbH Hanau Techical Service, May 1993.

Technische Information, Degussa AG–GB AC, Jun. 1988.

Formulations, Buna Hüls AP, 1992 Edition.

1991 Annual Book of ASTM Standards, vol. 09.01, Section 9, Rubber, Natural and Synthetic—General Test Methods; Carbon Black.

Funt, J.M. & Chung, B., Industrial Rubber Products: Carbon Black And Compound Performance, Cabot Corp. Rubber World, May 1990.

Huser, S.A., Neuartige EPDM–Polymer für Fenster–und Tördichtungen im Automobilbau, GAK Jul. 1991–Jahrgang 44.

Form PTO–892 corresponding to USSN 08/086,793.

Search Report from the Patent Office for the Australian Industrial Property Organization corresponding to USSN 08/086,793.

PCT International Search Report for International Application No. PCT/US93/08070 (corresponding to USSN 08/086,793).

Form PTO–892 corresponding to USSN 08/086,793.

Search Report from the Patent Office of the Australian Industrial Property Organization corresponding to USSN 08/086,793.

PCT International Search Report for International Application No. PCT/US93/08070 (corresponding to USSN 08/086,793).

* cited by examiner

CARBON BLACK CONTAINING EPDM COMPOSITIONS HAVING EITHER A HIGH GLOSS OR A TEXTURED MATTE FINISH

This application is a continuation, of application Ser. No. 08/632,644, filed Apr. 15, 1996, now abandoned, which is a continuation of U.S. patent application Ser. No. 08/086,793, filed Jul. 2, 1993, now abandoned, which is a CIP of Ser. No. 07/936,818 filed Aug. 27, 1992, now abandoned.

FIELD OF THE INVENTION

The present invention relates to EPDM compositions containing certain carbon blacks which when extruded or shaped have either a high gloss finish or a textured matte finish.

BACKGROUND

Carbon blacks have been widely utilized as fillers and reinforcing pigments in the compounding and preparation of EPDM compositions. Carbon blacks are generally characterized on the basis of their properties including, but not limited to, their surface areas, surface chemistry, aggregate sizes, and particle sizes. The properties of carbon blacks are analytically determined by tests known to the art, including iodine adsorption number ($I_2No.$) and dibutyl phthalate adsorption (DBP).

Heretofore generally known carbon black containing EPDM compositions yield profiles having a dull and flat surface finish when extruded or shaped. In contrast, a smooth glossy finish has a high degree of reflectance when viewed at any angle, in part due to the smooth nature of the surface. Conversely, a textured matte finish has a low degree of reflectance due in part to the rugged nature of the surface. EPDM compositions with high gloss or textured matte finishes are useful in industrial applications such as automotive weather stripping.

SUMMARY OF THE INVENTION

We have discovered EPDM compositions contain certain carbon blacks that yield profiles having either high gloss or textured matte finishes when extruded or shaped. The EPDM compositions comprise ethylene-propylene diene monomer (EPDM) and a specified carbon black, which when incorporated into the EPDM will provide articles having a desired high gloss or textured matte finish.

The amount of carbon black in the EPDM composition is such that the EPDM composition will, when extruded or shaped, yield profiles having a high gloss or textured matte finish. The amounts of carbon black utilized range from 100 to about 300 parts by weight for each 100 parts by weight of EPDM. It is, however, preferred to amounts varying from about 150 to about 250 parts by weight of carbon black per 100 parts by weight of EPDM.

EPDM is well known and is commercially available from a variety of sources. The EPDM compositions of the present invention may be produced by techniques generally known to those of ordinary skill in the art for mixing rubbers or polymers and carbon black. As will be understood by those of ordinary skill in the art the high gloss and textured matte finish EPDM compositions of the present invention are produced after extruding or otherwise shaping the carbon black-EPDM mixture.

The high gloss or textured matte finish EPDM compositions of the present invention are advantageous for use in applications where a high gloss or textured matte finish is desirable. One such application is automotive weatherstripping.

Other advantages of the present invention will become apparent from the following more detailed description of the invention.

DETAILED DESCRIPTION OF THE INVENTION

The EPDM compositions of the present invention which will yield a high gloss finish comprise EPDM and a carbon black selected from the group consisting of carbon blacks having a CTAB of about 10 $m^2/g$ to about 30 $m^2/g$ and a ratio of DBP/CTAB greater than about 4, preferably a CTAB of about 25 $m^2/g$ and a ratio of DBP/CTAB of about 5.3; and carbon blacks having a CTAB of about 30 $m^2/g$ to about 70 $m^2/g$ and DBP greater than about 125 cc/100g, preferably a DBP of about 125 cc/100g to about 160 cc/100g, and most preferably a CTAB of about 47 $m^2/g$ and DBP of about 126 cc/100g.

The EPDM compositions of the present invention which will yield a textured matte finish comprise EPDM and a carbon black having a CTAB of about 10 $m^2/g$ to about 70 $m^2/g$ and a ratio of DBP/CTAB less than about 1.5, preferably a CTAB of about 45 $m^2/g$ and a ratio of DBP/CTAB of about 1.0, and most preferably a CTAB of about 67 $m^2/g$ and a ratio of DBP/CTAB of about 0.7.

The amount of carbon black in the compositions of the present invention is sufficient to allow the EPDM composition to yield a profile having either a gloss or a textured matte finish after extruding or shaping. The amounts of carbon black to be incorporated into the EPDM compositions of the present invention range from 100 to about 300 parts by weight carbon black per 100 parts by weight EPDM, preferably from about 150 to about 250 parts by weight carbon black per 100 parts by weight EPDM.

The high gloss or textured matte finish EPDM compositions of the present invention may also contain conventional additives such as oils, stabilizers, oxides, acids, curing agents etc. known to those of ordinary skill in the art as useful for incorporation into, and during the formation of, EPDM compositions.

The high gloss or textured matte finish EPDM compositions of the present invention may be produced in any manner known to those of ordinary skill in the art for producing EPDM compositions incorporating carbon blacks. One method for producing the high gloss or textured matte finish compositions of the present invention, utilizing a Banbury BR mixer, is a follows.

The Banbury BR mixer is started and maintained at a temperature of 45° C. and a rotor speed of 77 RPM. EPDM is added to the mixer and mixed for approximately 30 seconds. Oil, and preferably zinc oxide and stearic acid, or compounds having similar properties, are added to the EPDM and mixed for approximately 2 additional minutes. The carbon black is added to the mixture and the temperature of the mixing chamber is cooled and maintained at a temperature of below approximately 135° C. The carbon black=—EPDM mixture is mixed for approximately 4 ½minutes and then curing agents are added to the mixture. The resulting mixture is mixed for approximately 1 ½minutes while the temperature is maintained at below approximately 135° C. The compound is then discharged from the mixer and extruded, or otherwise formed and cooled to form the high gloss or textured matte finish EPDM compositions of the present invention. By way of example, the batch compound may be extruded on a Brabender extruder at 50 RPM and 100° C. through a die having an opening of 1 inch in width and 0.020 inch in height. This will yield a profile having a high gloss or textured matte finish.

Although one method for producing the high gloss or textured matte finish EPDM compositions of the present invention has been described, the high gloss or textured matte finish EPDM compositions of the present invention may be produced by other methods for producing polymer or rubber compositions known to those of ordinary skill in the art.

The following testing procedures are used in the determination and evaluation of the analytical properties of the carbon blacks utilized in the following examples.

The DBP (dibutyl phthalate adsorption value) of the carbon black was determined according to the procedure set forth in ASTM D2414. The $I_2$No. (iodine adsorption number) of the carbon blacks was determined according to ASTM D1510. CTAB (cetyl-trimethyl ammonium bromide) absorption value of the carbon blacks was determined according to ASTM Test Procedure D3765-85. Tinting strength (Tint) of the carbon blacks was determined according to ASTM Test Procedure D3265-85a. The CDBP (dibutyl phthalate adsorption value of the crushed carbon blacks) was determined according to the procedure set forth in ASTM D3493-86.

The effectiveness and advantages of the present invention will be further illustrated by the following example.

EXAMPLE

Eighteen EPDM compositions were prepared incorporating six different carbon blacks at each of three different loading levels into EPDM. Carbon blacks A and B were utilized to produce textured matte finish EPDM compositions of the present invention RA1–RA3 and RB1–RB3, respectively. Two control carbon blacks, C and D, were utilized to produce EPDM compositions RC1–RC3 and RD1–RD3, respectively. Carbon blacks E and F were utilized to produce high gloss EPDM compositions of the present invention RE1–RE3 and RF1–RF3, respectively. The analytical properties of the carbon blacks A–F were as shown in Table 1 below:

TABLE 1

| | Carbon Blacks | | | | | |
|---|---|---|---|---|---|---|
| | A | B | C | D | E | F |
| $I_2$ No. (mg/g) | 40 | 63 | 30 | 35 | 22 | 51 |
| CTAB (cc/100 g) | 45 | 67 | 30 | 36 | 25 | 47 |
| DBP (m²/g) | 44 | 49 | 69 | 91 | 132 | 126 |
| CDBP cc/100 g | 43 | 45 | 59 | 72 | 77 | 83 |
| Tint (%) | 80 | 101 | 52 | 57 | 33 | 60 |
| DBP/CTAB | 1.0 | 0.7 | 2.3 | 2.5 | 5.3 | 2.7 |

EPDM compositions RA1, RA2, RA3; RB1, RB2, RB3; RC1, RC2, RC3; RD1, RD2, RD3; RE1, RE2, RE3; and RF1, RF2, RF3 were prepared utilizing each of the carbon black samples in amounts of 150 parts by weight, 200 parts by weight and 250 parts by weight in the EPDM Compound Formulation shown below in Table 3. The carbon black and amount by weight of the carbon black utilized in the EPDM compositions were as shown in Table 2.

TABLE 2

| EPDM COMPOSITION | CARBON BLACK | AMOUNT BY WEIGHT |
|---|---|---|
| RA1 | A | 150 |
| RA2 | A | 200 |
| RA3 | A | 250 |
| RB1 | B | 150 |
| RB2 | B | 200 |
| RB3 | B | 250 |
| RC1 | C | 150 |
| RC2 | C | 200 |
| RC3 | C | 250 |
| RD1 | D | 150 |
| RD2 | D | 200 |
| RD3 | D | 250 |
| RE1 | E | 150 |
| RE2 | E | 200 |
| RE3 | E | 250 |
| RF1 | F | 150 |
| RF2 | F | 200 |
| RF3 | F | 250 |

TABLE 3

EPDM COMPOUND FORMULATION

| INGREDIENT | PART BY WEIGHT |
|---|---|
| EPDM | 100 |
| Carbon Black | 150/200/250 |
| Sunpar 2280 Oil | 100 |
| Zinc Oxide | 5 |
| Stearic Acid | 1 |
| TMTDS | 2.7 |
| Butyl Zimate | 2.7 |
| Methyl Zimate | 2.7 |
| Sulfur | 0.5 |
| Sulfasan R | 1.7 |

EPDM - EXXON VISTALON ® 5600, manufactured and sold by EXXON Corporation, Wilmington, Delaware;
Sunpar 2280 - A trademarked oil manufactured and sold by Sun Oil Company;
TMTDS - tetramethylthiuram disulfide;
Butyl Zimate - a trademarked zinc dibutyldithiocarbamate manufactured and sold by R. T. Vanderbilt Co.;
Methyl Zimate - a trademarked zinc dimethyldithiocarbamate manufactured and sold by R. T. Vanderbilt Co.;
Sulfasan R - a trademarked 4,4'-dithiodimorpholine, manufactured and sold by Monsanto, Co., St. Louis, Missouri.

The EPDM compounds were produced as follows. A Banbury BR mixer was started and maintained at a temperature of 45° C. and a rotor speed of 77 RPM. EPDM was added to the mixer and mixed for approximately 30 seconds. The Sunpar 2280 oil, zinc oxide and stearic acid, were added to the EPDM and mixed for approximately 2 additional minutes. The carbon black was added to the mixture and the temperature of the mixing chamber was cooled and maintained at a temperature of below approximately 135° C. The carbon black—EPDM mixture was mixed for approximately 4 ½ minutes and then the TMTDS, Butyl Zimate, Methyl Zimate, Sulfur and Sulfasan R products were added to the mixture. The resulting mixture was mixed for approximately 1 ½ minutes while the temperature was maintained at below approximately 135° C. The batch compound was then discharged from the mixer and extruder on a Brabender extruder at 50 RPM and 100° C. through a die having an opening of 1 inch in width and 0.020 inch in height to produce the EPDM compositions RA1–RF3 in the form of profiles.

Upon visual inspection, the finish of each of the EPDM profiles was as follows:

| EPDM COMPOSITION | FINISH |
|---|---|
| RA1 | Textured Matte |
| RA2 | Textured Matte |

| EPDM COMPOSITION | FINISH |
| --- | --- |
| RA3 | Textured Matte |
| RB1 | Textured Matte |
| RB2 | Textured Matte |
| RB3 | Textured Matte |
| RC1 | Dull and Flat |
| RC2 | Dull and Flat |
| RC3 | Dull and Flat |
| RD1 | Dull and Flat |
| RD2 | Dull and Flat |
| RD3 | Dull and Flat |
| RE1 | High Gloss |
| RE2 | High Gloss |
| RE3 | High Gloss |
| RF1 | High Gloss |
| RF2 | High Gloss |
| RF3 | High Gloss |

These results show that the EPDM compositions RA1–RA3 and RB1–RB3 of the present invention have a textured matte finish whereas EPDM compositions RE1–RE3 and RF1–RF3 have a high gloss finish. Samples produced with the control carbon backs, RC1–RC3 and RF1–RF3, have a dull and flat surface appearance which is neither highly glossy nor textured matte.

It should be clearly understood that the forms of the present invention herein described are illustrative only and are not intended to limit the scope of the invention.

What is claimed is:

1. An ethylene-propylene-diene-monomer(EPDM) composition having a textured matte finish when extruded comprising ethylene-propylene-diene-monomer (EPDM) and a carbon black having a cetyl-trimethyl ammonium bromide absorption value (CTAB) of about 10 $m^2/g$ to about 70 $m^2/g$ and a ratio of dibutyl phthalate adsorption value/cetyltrimethyl ammonium bromide absorption value (DBP/CTAB) less than about 1.5, wherein the carbon black is present in an amount of 100 to about 300 parts by weight carbon black per 100 parts by weight ethylene-propylene-diene-monomer(EPDM).

2. The ethylene-propylene-diene-monomer (EPDM) composition of claim 1 wherein the carbon black is present in an amount of about 150 to about 250 parts by weight carbon black per 100 parts by weight ethylene-propylene-diene-monomer (EPDM).

3. The ethylene-propylene-diene-monomer (EPDM) composition of claim 1 wherein the carbon black has a cetyl-trimethyl ammonium bromide absorption value (CTAB) of about 45 $m^2/g$ and a ratio of dibutyl phthalate adsorption value/cetyl-trimethyl ammonium bromide absorption value (DBP/CTAB) of about 1.0.

4. The ethylene-propylene-diene-monomer (EPDM) composition of claim 1 wherein the carbon black has a cetyl-trimethyl ammonium bromide absorption value (CTAB) of about 67 $m^2/g$ and a ratio of dibutyl phthalate adsorption value/cetyl-trimethyl ammonium bromide absorption value (DBP/CTAB) of about 0.7.

5. An article of manufacture having a textured matte finish formed from an ethylene-propylene-diene-monomer (EPDM) composition comprising ethylene-propylene-diene-monomer (EPDM) and a carbon black having a cetyl-trimethyl ammonium bromide absorption value (CTAB) of about 10 $m^2/g$ to about 70 $m^2/g$ and a ratio of dibutyl phthalate adsorption value/cetyl-trimethyl ammonium bromide absorption value (DBP/CTAB) less than about 1.5, wherein the carbon black is present in an amount of 100 to about 300 parts by weight carbon black per 100 parts by weight ethylene-propylene-diene-monomer (EPDM).

* * * * *